Nov. 10, 1959     E. D. ROGAK     2,911,796
HEAT EXCHANGE PROCESS
Filed July 9, 1954
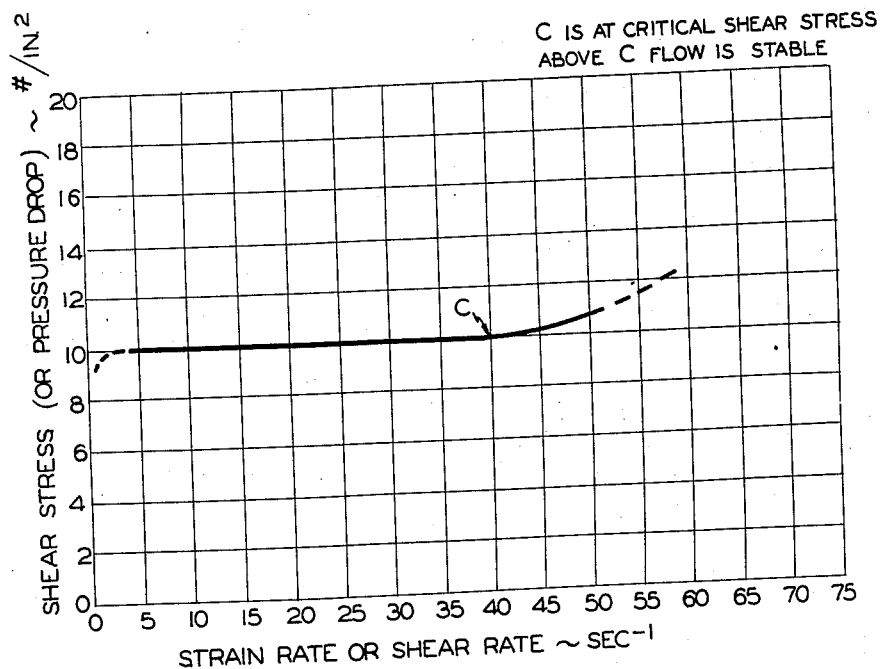
INVENTOR
EARL D. ROGAK
BY *Adams Forward & McLean*
ATTORNEY

2,911,796

United States Patent Office

Patented Nov. 10, 1959

2,911,796

HEAT EXCHANGE PROCESS

Earl D. Rogak, Harvey, Ill., assignor to Sinclair Refining Company, New York, N.Y., a corporation of Maine Application July 9, 1954, Serial No. 442,327

2 Claims. (Cl. 62—98)

This invention relates to a process of cooling greases continuously.

The manufacture of grease generally involves the use of elevated temperatures and characteristically the grease product is at an elevated temperature upon the completion of the manufacturing process. For efficient use of the manufacturing equipment it is necessary that the grease be packaged and stored as rapidly as possible; hence the grease must be removed from the kettles, or other reaction equipment, and cooled. Where grease is to be milled, it is necessary that it be held at a constant temperature when fed into the colloidal mill from the cooler. Normally, grease is cooled batchwise in pans and trays or cooled continuously in scraped-surface equipment, for example, in rotators. Batch methods, though widely used, generally are unsatisfactory in any production process and generally are used where quantities are small and space and equipment requirements are not pressing. A continuous cooling process employing scraped-surface equipment has several inherent characteristics which are undesirable, including high initial and operating costs in addition to very high space requirements. There is a need, in this art, for a cooling method permitting use of conventional, compact and inexpensive equipment having low operating costs.

I have now discovered that grease can be cooled continuously employing the compact, relatively inexpensive tube and shell heat exchangers. My novel process is effected by passing grease at a defined rate of flow to obtain steady state conditions, i.e. uniform rate of product at a constant outlet temperature, through an enclosed zone in indirect heat exchange relationship with a cooling medium. The flow rate employed is determined by the characteristics of the stress-strain-rate curve of the grease being cooled. I have found that to obtain stable flow, and hence satisfactory cooler performance, when employing two or more enclosed heat exchange passages in parallel or other heat exchange passages where channeling is possible, it is critically essential to operate at a stress sufficiently high that any infinitesimal fluctuation in stress will result in only an infinitesimal change in the strain-rate of the grease as distinguished from an infinitesimal change in stress resulting in a finite change in strain-rate. In other words, the ratio of the rate of change of stress to rate of change of strain-rate must be substantially greater than zero for steady state conditions to exist. Shear stress is the force actuating flow, and in an enclosed passage is proportional to the pressure drop. Strain-rate, or shear-rate, is the velocity gradient in the grease and is directly proportional to the grease velocity. By channeling I intend to indicate that phenomenon wherein flow of a fluid through a plurality of parallel passages occurs at different rates in different passages while the same pressure is applied to the fluid. Channeling in single passages generally occurs where the diameter of the passage is large, i.e. on the shell side of a tube and shell exchanger, and the fluid tends to flow at different velocities in different areas of the passage.

The novel process constituting my invention involves, in one advantageous form, the use of high rates of grease recycle to obtain the defined flow rates thereby facilitating continuous cooling of grease in a conventional tube and shell exchanger on either the tube or shell sides. I have discovered that recycle in a grease cooling process, contrary to normal expectations while cooling highly viscous single phase fluids, results in decreased pressure and power requirements when compared with the requirements when recycle is not used. This phenomenon, I believe, is a result in part of thixotropic breakdown as a result of the working of the grease by the recycle pumping and thus a temporary decrease in the grease viscosity, thereby facilitating grease flow at lower power requirements. Coupled with viscosity decrease attendant upon thixotropic breakdown is the decrease in viscosity resulting from increased shear-rate—a characteristic of Non-Newtonian systems exemplified by grease. Recycle further contributes to the continuous cooling process in the respect that temperature drop of the grease through the exchanger is minimized. Upon being cooled grease will obviously increase in viscosity; a large and rapid viscosity change would tend to plug the tubes thereby slowing the grease; once slowed down, the grease will be further cooled, again lowering the viscosity and thus further slowing the grease. The use of recycle effects a mixing of a large mass of cooled grease with a small mass of the fresh feed, in effect reducing the inlet temperature and minimizing the temperature drop of the grease through the cooler. Recycle ratios of above about 5 parts by weight of recycle grease per part of fresh grease can be advantageously used with about 10 to 20 parts or more of recycle per part of fresh grease being preferred; the upper limit of recycle is determined by the practical consideration of power requirements in view of the increasing pressure drop at higher recycle ratios. By employing flow characteristics as above defined, i.e. at a ratio of change in stress to change in strain-rate of substantially greater than zero, it is possible to cool grease continuously in once through operation, that is, without recycle. However, optimum results are obtained when practicing the invention with recycle as smaller equipment can be used and the working of the grease by the action of the recycle pump effectively reduces grease viscosity.

At a given temperature each grease has a characteristic stress-strain rate curve which can be obtained using a pressure viscosimeter. A grease of known characteristics is pumped through the viscosimeter at varying rates, and data on the pressure necessary for different velocities are collected. The shear stress on the greases is then calculated by the formula:

$$\text{shear stress} = \frac{PR}{2L}$$

where P is the pressure in p.s.i. to force the grease through a capillary of length L and radius R, each being in the same units. The rate of strain or shear-rate, which is directly proportional to velocity, is defined by $$\frac{\text{Volumetric flow rate}}{\frac{\pi R^3}{4}} \text{ or } \frac{4V}{R}$$

where V is the average velocity through the capillary and R is the radius. The curve can be plotted from data thus obtained with the pressure viscosimeter. To determine the flow characteristics necessary for cooling grease in accordance with the present invention it is necessary only to observe the point, in the high stress area of the stress-strain rate curve, where for each infinitesimal change in stress no more than an infinitesimal change occurs in the strain-rate. By taking any strain-rate equal to or greater than that at the defined point and substituting it in the strain-rate formula, the volumetric flow rate of grease necessary for a given heat exchange system having heat exchange passage of known characteristics can be calculated. As a practical consideration it is desirable to determine the critical strain-rate for the average temperature to be encountered and operate at a higher strain-rate than the one so determined to insure stable flow conditions. By this procedure the possibility of encountering unstable conditions due to employing a strain-rate satisfactory for one temperature at a second where such strain-rate being employed is less than that corresponding to the critical strain-rate for the second temperature is avoided.

The present invention will be further described by means of the attached drawing, which is a stress-strain-rate curve for a mineral oil grease containing lithium 12-hydroxy stearate, and the following specific example.

Example I

The stress-strain-rate curve for a mineral oil grease containing lithium 12-hydroxy stearate and having a density of about 0.8 gram per cc., was determined in the usual manner with a pressure viscosimeter (see attached graph) and the critical strain-rate was found to be 40 ft./sec./ft. or 40 sec.$^{-1}$. It was desired to cool this grease in a ten tube single pass tube and shell heat exchanger having seven feet long, 0.62″ I.D. steel tubes and equipped for recycle operation. The necessary minimum velocity to be employed was found by the formula:

$$\text{strain-rate} = \frac{4V}{R}$$

and is 0.258 ft./sec. The critical mass flow rate was then found to be about 19.6 pounds per minute; it was decided to operate at a higher flow rate than was calculated to insure stable flow conditions.

Grease from a 400 pound kettle amounting to about 5 pounds per minute at a temperature of about 270° F. was fed to one end of the exchanger and the recycle pump was adjusted to provide 87.6 pounds of recycle grease per minute. The coolant was water supplied at a rate of about 43.0 pounds per minute at a temperature of about 61° F. at the output side of the exchanger. A steady product of grease at about 156° F. was obtained. The grease velocity in the exchanger tubes in this run was 1.358 ft./sec. and was determined by calculation of effective velocity (effective velocity is obtained by dividing total volumetric flow by total cross-sectional area of exchanger).

Although my invention has been illustrated above with a specific grease, it is applicable to various grease compositions. For instance, the fatty component of the grease can be any of the fatty acid saponifiable materials having about 10 to 32 carbon atoms and can be saturated or unsaturated and substituted as with other polar groups. These acids include palmitic, stearic, oleic, linoleic, ricinoleic, palm oil fatty acids, cottonseed oil fatty acids, hydrogenated fish oil fatty acids, and their mixtures. Also, the glycerides of these acids can be used such as lard, lard oil, rape seed oil, palm seed oil, etc. Other acids which can be employed are those derived from petroleum such as naphthenic acids, petroleum sulfonic acids, and petroleum oil and wax oxidates.

Among the saponifying or soap-forming bases which can be used in preparing greases which can be cooled by the process of my invention are the alkali metal bases such as those of lithium, sodium and potassium, and the alkaline earth metal bases such as those of barium, calcium and strontium. Other saponifying metals normally used in forming the soap constituents of greases can be employed, e.g. aluminum, as well as mixtures of these soap-forming bases and other known inorganic gelling agents.

The invention is applicable to greases having base oils such as mineral oils and synthetic oils. The mineral oils which can be used are of wide viscosity range, for instance, from about 50 SUS at 100° F. to about 2000 SUS at 210° F. The oil can be highly refined and solvent-treated, if desired, by known means. Among the synthetic lubricants which can be employed are polymerized olefins, alkylated aromatics, silicone polymers, polyalkylene glycols and their partial or complete ethers and esters.

I claim:

1. The method of cooling a soap-thickened grease which comprises passing said grease in indirect heat exchange relationship with a cooling medium through a heat exchanger having a passage in which channeling of the grease can occur, at a velocity at least equal to $$\frac{(SR')(R)}{4}$$

when R is equal to the radius of the passage and SR′, the strain rate, is sufficient to give a ratio of change in stress to change in strain rate of the grease substantially greater than zero, said strain rate being greater than that which gives a ratio of change in stress to change in strain rate of zero.

2. The method of claim 1 wherein the soap-thickened grease being cooled consists essentially of 1 part of fresh soap-thickened grease and 5 to 20 parts of recycled soap-thickened grease.

References Cited in the file of this patent

UNITED STATES PATENTS

| | | |
|---|---|---|
| 1,645,742 | Fee | Oct. 18, 1927 |
| 2,107,053 | Coons | Feb. 1, 1938 |
| 2,478,863 | Davis | Aug. 9, 1949 |
| 2,478,917 | Hain | Aug. 16, 1949 |
| 2,578,192 | Mair | Dec. 11, 1951 |